United States Patent [19]

Merritt

[11] 4,270,997

[45] Jun. 2, 1981

[54] LASER PHOTOCHEMICAL SYNTHESIS OF $Si_3N_4$

[75] Inventor: James A. Merritt, Pulaski, Tenn.

[73] Assignee: The United States of America as represented by the Secretary of the Army, Washington, D.C.

[21] Appl. No.: 137,887

[22] Filed: Apr. 7, 1980

Related U.S. Application Data

[62] Division of Ser. No. 87,115, Oct. 22, 1979, Pat. No. 4,227,907.

[51] Int. Cl.$^3$ ............................................. B01J 19/12
[52] U.S. Cl. ............................................. 204/157.1 R
[58] Field of Search ................. 204/157.1 R, DIG. 11

[56] References Cited

PUBLICATIONS

Brekel et al., Journal of Electrochemical Society (Mar. 1972), pp. 372–375.
Gross, Optical Engineering (Nov./Dec. 1974), vol. 13, No. 6, pp. 506–508.

*Primary Examiner*—Howard S. Williams
*Attorney, Agent, or Firm*—Nathan Edelberg; Robert P. Gibson; Jack W. Voigt

[57] ABSTRACT

Disclosed is a method to synthesize $Si_3N_4$ from $SiX_4 + NX_3$, wherein X is selected from hydrogen and/or fluorine, by laser photochemical reaction (LPR) technique in a controlled atmosphere chamber wherein the reactant gases are maintained at pressures between about 10 and about 200 torr in a molar volume ratio of about 3 of the $SiX_4$ to about 4 of the $NX_3$. The LPR method produces the compound $Si_3N_4$ at room temperature while employing a pulsed laser or a continuous wave laser.

1 Claim, No Drawings

LASER PHOTOCHEMICAL SYNTHESIS OF SI₃N₄

DEDICATORY CLAUSE

The invention described herein may be manufactured, used, and licensed by or for the Government for governmental purposes without the payment to me of any royalties thereon.

CROSS-REFERENCE TO RELATED APPLICATION

This is a division of application Ser. No. 087,115, filed Oct. 22, 1979, now U.S. Pat. No. 4,227,907.

BACKGROUND OF THE INVENTION

The mechanical strength of optical fibers in excess of $2 \times 10^5$ psi is a desirable feature for certain specialized application (e.g., optical waveguides employing lengths of fiber).

Lack of mechanical strength is due to submicron flaws in the surface attributed, mainly, to chemical attack by atmospheric contaminants (e.g., moisture) during and after fiber drawing. Attempts to solve these problems have been studied by applying organic coatings to the fiber following the drawing of the fiber. Failure resulted because those organic coatings are not impervious to moisture or hydroxyl penetration. The penetration by moisture or hydroxyl resulted in reduced strength of the coated fiber during periods of storage and/or use.

Silicon nitride ($Si_3N_4$) is an appropriate coating since it is resistant to moisture penetration and bonds securely to the silicon substrate fiber. Previous attemps to clad silicon fibers with $Si_3N_4$ uses thermal (pyrolysis) techniques.

Thermal (pyrolysis) methods of influencing chemical processes lead, mainly, to the excitation of all degrees of freedom of the molecule. Both external (translational) and internal (electronic, vibrational and rotational) degrees of freedom are usually in thermodynamic equilibrium. In addition to there being an unproductive waste of energy, reactions with equilibrium excited molecules characteristically proceed in the direction of breaking the weakest bond, have a considerable percent of back reaction, many side reactions, and produce polymers.

Advantageous would be a method which employs laser photochemical reactions (LPR) to produce silicon nitride to clad freshly-drawn silicon fibers in an atmospheric controlled chamber. A particular advantage is recognized over the prior art vapor deposition method since the LPR method can be effected at room temperature.

An object of this invention to provide a method of coating optical fibers with $Si_3N_4$ produced by laser photochemical reactions.

Another object of this invention is to deposit $Si_3N_4$ on freshly-drawn silicon optical fibers in an atmospheric controlled chamber in a continuous operation which employs $SiF_4$ and $NH_3$ as the reaction gases.

A further object of this invention is to deposit $Si_3N_4$ on freshly-drawn silicon optical fibers in an atmospheric controlled chamber in a continuous operation which employs $SiH_4$ and $NF_3$ as the reaction gases.

SUMMARY OF THE INVENTION $Si_3N_4$ is produced at room temperature in an atmospheric controlled chamber are coated with $Si_3N_4$ by laser photochemical reactions which are initiated in accordance with the following equation:

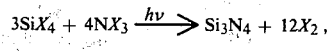

$$3SiX_4 + 4NX_3 \xrightarrow{h\nu} Si_3N_4 + 12X_2,$$

wherein X is H and/or F when reaction is initiated by a $CO_2$ laser.

DESCRIPTION OF THE PREFERRED EMBODIMENT

A silicon optical fiber is hermetically sealed by cladding with $Si_3N_4$ synthesized by laser photochemical reactions initiated on the gases $SiX_4$ and $NX_3$ in a controlled atmosphere.

The silicon optical fiber is prepared in a standard fiber drawing furnace from a preform rod of fused silica which is brought to its yield point at about 2000° C. The silicon fiber is drawn from the preform and through a chamber with controlled atmosphere ($SiX_4$ and $NX_3$ gases, wherein X is hydrogen and/or fluorine) at room temperature. The laser is used to irradiate this atmosphere to form $Si_3N_4$ which is coated on the silicon optical fiber to a thickness of about 0.02–0.20 micrometer.

The laser photochemical reaction initiated by the process of this invention when conducted in the presence of other substrates; e.g., other than optical fibers such as rocket motor nozzles or other components is effective in providing a coating of $Si_3N_4$ on the substrates at room temperature (about 25° C.). This method permits coating other materials which could not withstand high temperature conditions employed by vapor deposition method. A pressure between about 10 and 200 torr of the reactive gases is satisfactory for coating the silicon optical fiber with the reaction product, $Si_3N_4$. The thickness of the coating is proportionate to the flow rate of the reactants through the reaction chamber.

The laser photochemical reaction initiated by the process of this invention is an effective method for producing the compound $Si_3N_4$ at room temperature. For this particular method the laser photochemical synthesis can be carried out by employing a pulsed laser or a continuous wave laser. The laser radiation is directed through a salt window into a controlled atmosphere of $SiX_4$ and $NX_3$, wherein X is selected from hydrogen and/or fluorine. For example $Si_3N_4$ is synthesized from $SiF_4 + NH_3$ and/or $SiH_4 + NF_3$ at room temperature in either a batch process or in a continuous flowing process. The product is separated as a solid powder in high yield by using a cold finger or scraping the solid powder from reaction chamber surfaces. The laser photochemical synthesis is illustrated as follows:

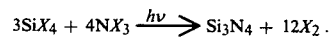

$$3SiX_4 + 4NX_3 \xrightarrow{h\nu} Si_3N_4 + 12X_2.$$

I claim:

1. A method of producing $Si_3N_4$ by laser photochemical reaction initiated by irradiating the reactant gases in a controlled atmosphere laser reaction chamber, said method comprising:
   (a) introducing into a laser reaction chamber that is provided with a salt window transparent to laser radiation, a controlled atmosphere of the reactant gases of $SiX_4$ and $NX_3$, wherein X is selected from hydrogen and fluorine, said gases maintained in a controlled atmosphere at pressures between about 10 and about 200 torr in a molar volume ratio of about 3 of said $SiX_4$ to about 4 of said $NX_3$;

(b) irradiating said controlled atmosphere with the P(36) line of a $CO_2$ laser to produce said $Si_3N_4$ as a powdery solid; and, (c) separating and removing said powdery solid of $Si_3N_4$ from said laser reaction chamber.

* * * * *